United States Patent
Liu et al.

(10) Patent No.: US 11,022,420 B2
(45) Date of Patent: Jun. 1, 2021

(54) FLATNESS SENSING DEVICE AND METHOD FOR DETECTING PRESSURES APPLIED BY AN OBJECT TO THE FLATNESS SENSING DEVICE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Eddy Liu, New Taipei (TW); Xi-Hang Li, Zhengzhou (CN); Jun-Kang Fang, Zhengzhou (CN); Po-Lin Su, New Taipei (TW); Wei Wu, Zhengzhou (CN); Xue-Wei Wang, Zhengzhou (CN); Yi-Lung Chen, New Taipei (TW); Guo-Yi Cui, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 255 days.

(21) Appl. No.: 16/298,451

(22) Filed: Mar. 11, 2019

(65) Prior Publication Data
US 2020/0200520 A1    Jun. 25, 2020

(30) Foreign Application Priority Data
Dec. 20, 2018    (CN) .......................... 201811563238.X

(51) Int. Cl.
*G01B 5/28* (2006.01)
*G01B 21/30* (2006.01)
*G08B 21/18* (2006.01)

(52) U.S. Cl.
CPC ............. *G01B 5/28* (2013.01); *G08B 21/182* (2013.01)

(58) Field of Classification Search
CPC ...... G06F 3/14; G06F 3/0418; G01M 99/008; G01L 25/00; G01B 5/28; G01B 7/34; G01B 21/30; G08B 21/18
See application file for complete search history.

(56) References Cited

U.S. PATENT DOCUMENTS

| | | | |
|---|---|---|---|
| 2016/0349131 A1* | 12/2016 | Chang | G01L 9/0072 |
| 2019/0384479 A1* | 12/2019 | Togashi | G06F 3/0446 |
| 2020/0056955 A1* | 2/2020 | Lee | G01M 99/008 |

\* cited by examiner

*Primary Examiner* — Brandi N Hopkins
(74) *Attorney, Agent, or Firm* — ScienBiziP, P.C.

(57) ABSTRACT

A flatness sensing device includes a pressure sensing unit and a controller. The pressure sensing unit includes a plate portion, and a pressure sensor fixed and exposed at an edge of the plate portion. A sensing surface of the pressure sensor is flush with the bottom surface of the plate portion. The pressure sensor senses a pressure or lack of pressure of an object to be tested when it touches the object to be tested. The controller receives the pressure value output from the pressure sensor and determines a flatness of the object to be tested, the controller can issue an alarm on finding non-flatness and cause the degree of flatness to be displayed to a user.

17 Claims, 4 Drawing Sheets

FLATNESS SENSING DEVICE AND METHOD FOR DETECTING PRESSURES APPLIED BY AN OBJECT TO THE FLATNESS SENSING DEVICE

FIELD

The subject matter herein generally relates to pressure sensing.

BACKGROUND

A large LED display screen, or LCD display screen, or glass display screen and so on, can be formed by assembling a plurality of basic units of small sizes. If the flatness and gaps between the assembled basic units cannot be ensured, the overall display and the visual effect will be affected. Therefore, the flatness between adjacent assembled basic units is a key factor for the display effect of the final assembled display screen.

Therefore, there is room for improvement within the art.

BRIEF DESCRIPTION OF THE DRAWINGS

Implementations of the present technology will now be described, by way of embodiments only, with reference to the attached figures.

DETAILED DESCRIPTION

Figure 1:
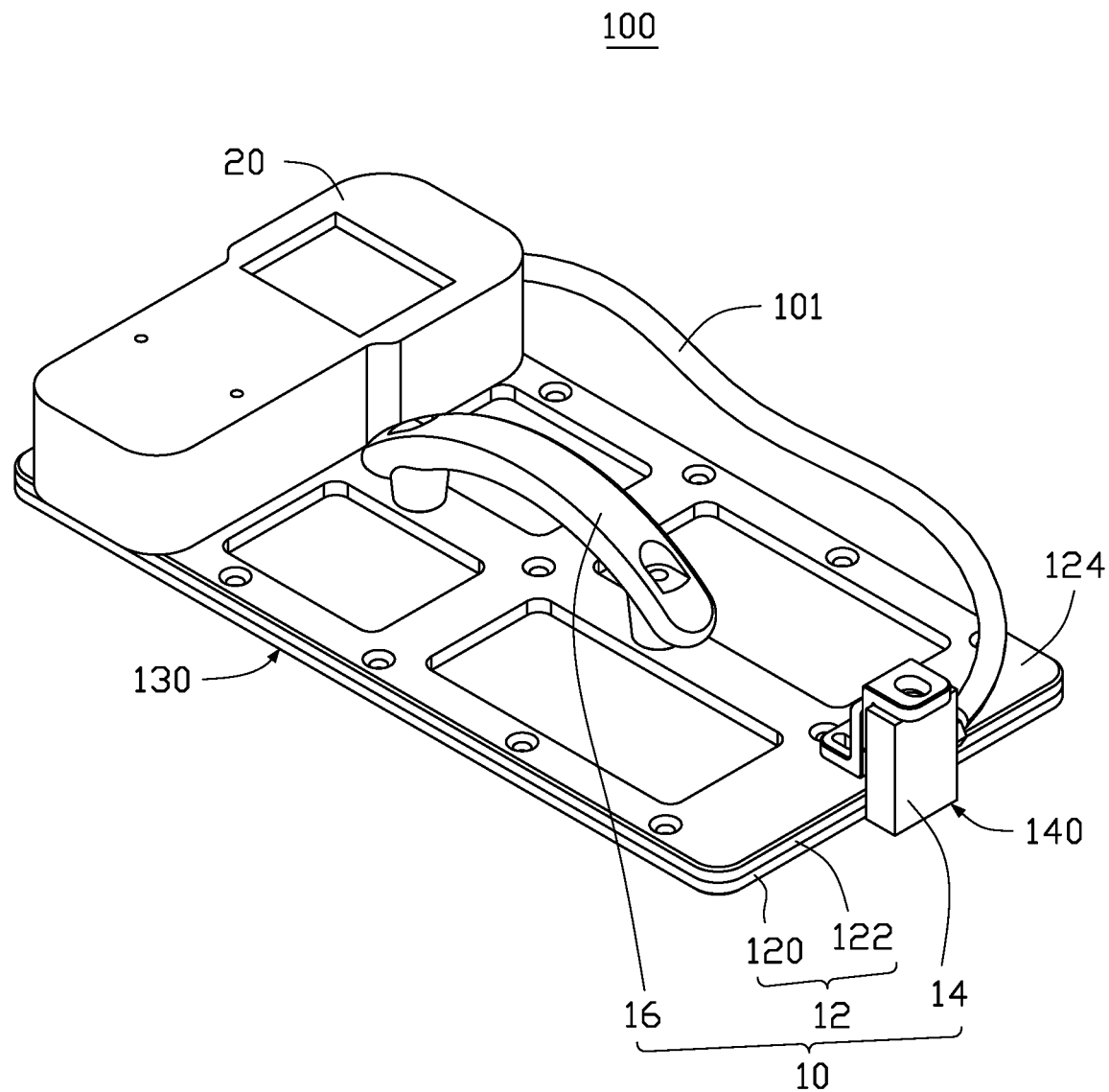
FIG. 1 is an isometric view of a flatness sensing device in accordance with one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

Figure 2:
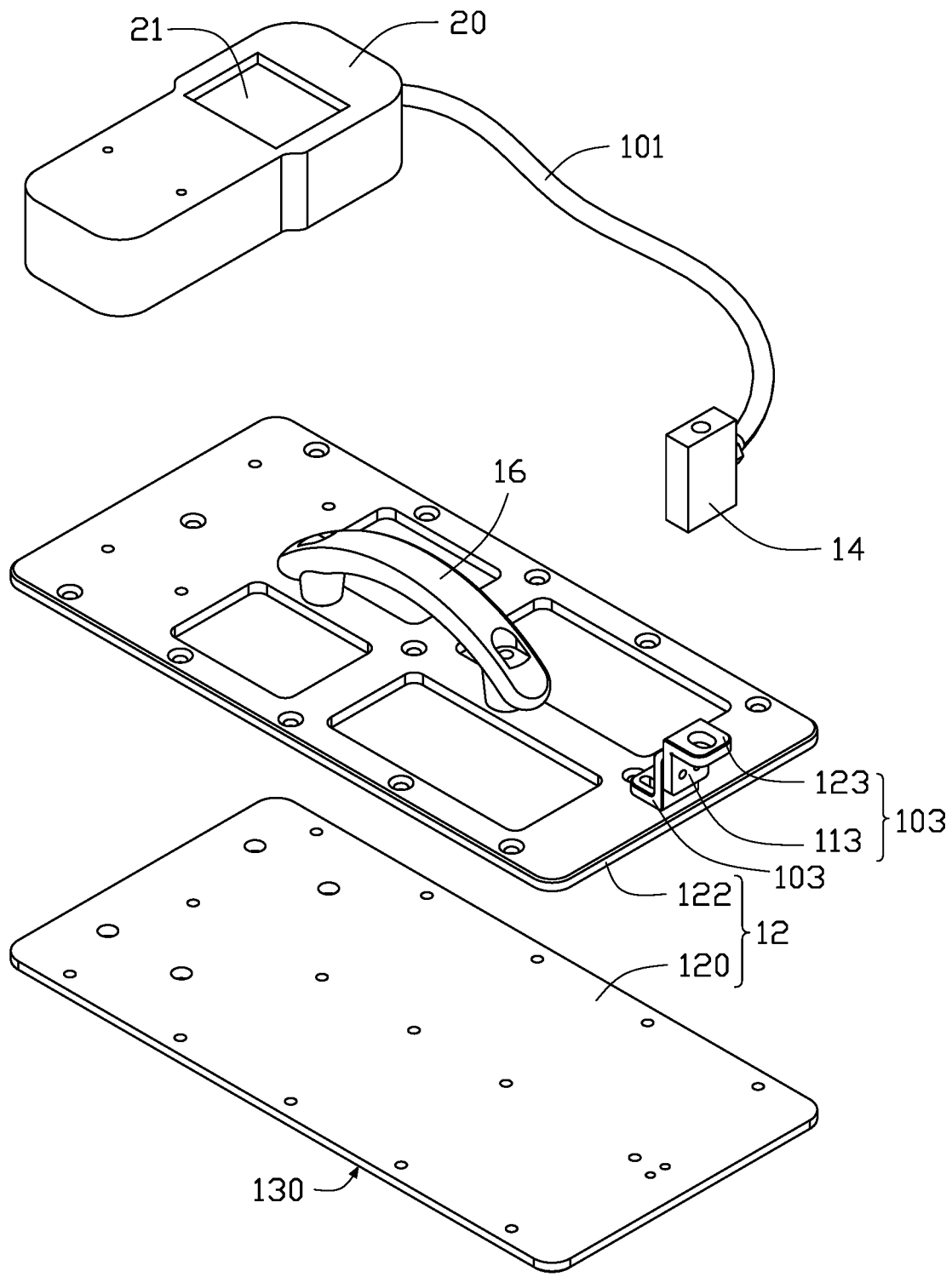
FIG. 2 is an exploded view of the flatness sensing device in FIG. 1.

FIGS. 1-2 illustrate a flatness sensing device 100. The flatness sensing device 100 detects pressures of an assembled device when the plurality of basic units is assembled into an array to form the assembled device, and to determine a flatness of each basic unit in the assembly according to the measuring value range of the pressure. The assembled device can be a LED display, a LCD display, a glass display, and so on. The disclosure is not limited to display screens, the flatness sensing device 100 can be used for detection of flatness of assembled devices of which flatness needs to be determined. Flatness refers to any differences in height across a surface which should be entirely flat when assembled. The smaller the differences in heights, the better flatness of the surface.

The flatness sensing device 100 includes a pressure sensing unit 10 and a controller 20. The pressure sensing unit 10 senses a pressure on its surface when it's in contact with an object to be tested. The pressure sensing unit 10 communicates data with the controller 20. The data communication mode between the pressure sensing unit 10 and the controller 20 may be via a wire, a wireless network, a near field wireless communication (NFC) or a BLUETOOTH signal transmission. In the embodiment, the controller 20 is electrically connected to the pressure sensing unit 10 by wire 101.

The pressure sensing unit 10 includes a plate portion 12, a pressure sensor 14 arranged at an edge of the plate portion 12, and a handle 16.

The plate portion 12 includes a bottom plate 120 and a fixing frame 122 fixed to the bottom plate 120. The bottom plate 120 and the fixing frame 122 are substantially rectangular. A size of the fixing frame 122 is approximately the same as the size of the bottom plate 120. In the embodiment, a thickness of the bottom plate 120 is the same as a thickness of the fixing frame 122.

A material of the bottom plate 120 is plastic to better prevent scratching or abrading a surface to be tested.

The plastic is selected from thermoplastic or thermosetting plastics. The thermoplastic plastic is selected from the group consisting of poly butylene terephthalate (PBT), poly phenylene sulfide (PPS), poly ethylene terephthalate (PET), poly ether ether ketone (PEEK), poly carbonate (PC), polyvinyl chloride (PVC). The thermosetting plastic is selected from epoxy resin, polyurea resin or UV adhesive. The UV adhesive is acrylic resin or polyurethane.

The fixing frame 122 is made of metal material such as aluminum alloy or can be made from plastic. In the embodiment, the fixing frame 122 is made of aluminum alloy. Aluminum alloy material has a light weight and high strength. The fixing frame 122 prevents the bottom plate 120 from warping.

The fixing frame 122 is a hollowed structure. The fixing frame 122 defines a plurality of windows of a plate body with uniform thickness, so as to reduce the overall weight of the flatness sensing device 100. The fixing frame 122 can be fixed with the bottom plate 120 by glue or screws. The bottom surface 130 of the bottom plate 120 is a smooth, horizontal and flat plane.

The pressure sensor 14 is fixed at an edge of the fixing frame 122 and is exposed outside of the fixed frame 122. The pressure sensor 14 includes a sensing surface 140. The sensing surface 140 of the pressure sensor 14 is flush with the bottom surface 130 of the bottom plate 120. Optionally, the pressure sensor 14 may be fixed by fixing block 103 at an edge in a middle position of a wide side 124 of the fixing frame 122.

In the embodiment, the number of fixing blocks 103 is two. Each fixing block 103 is substantially L-shaped and includes a vertical portion 113 and a horizontal portion 123 connected with the vertical portion 113. The vertical portions 113 of the two fixing blocks 103 are overlapped and fixed, and the horizontal portion 123 is oppositely arranged. In the embodiment, one horizontal portion 123 is fixed with the fixing frame 122, the other horizontal portion 123 is configured to mount and fix the pressure sensor 14, to make sure that the sensing surface 140 of the pressure sensor 14 is flush with the bottom surface 130 of the bottom plate 120.

The sensing surface 140 of the pressure sensor 14 senses pressure when it comes into contact with an object to be tested. An embodiment of the pressure sensor 14 senses pressure by changing of capacitance. The structure of the pressure sensor 14 may include a circuit board, a first electrode disposed on the circuit board, and a second electrode arranged spaced apart from the first electrode, a capacitance being formed between the first electrode and the second electrode.

When a pressure is applied on the sensing surface 140 of the pressure sensor 14, the first electrode and the second electrode deform, thus the capacitance between the first electrode and the second electrode will change. The variation of the distance between the two electrodes can be determined based on the change of the capacitance, and the pressure applied on the pressure sensor 14 can be determined based on the deformation. A structure of the pressure sensor is not limited, pressure sensors with structures can be used for this purpose.

In order to ensure an accuracy of the pressure measurement, a size of the plate portion 12 can be designed according to a size of the object to be tested. In the embodiment, the plate portion 12 has a size of D1, the object to be tested has a size of D2, and D1 and D2 satisfy the premise D2≤D1≤2D2. Alternatively, the size D1 of the plate 12 is approximately the same as the size D2 of the object to be tested. When the flatness sensing device 100 is used for pressure detection, one part of the plate portion 12 is in contact with a reference object and the other part is in contact with the object to be tested.

The handle 16 is fixed on the fixing frame 122, preferably on a central position of the upper surface of the fixing frame 122. An extending direction of the handle 16 is consistent with a length direction of the fixing frame 122. Thereby, the flatness sensing device 100 can be quickly moved from the surface of one part of a basic unit to the surface of another basic unit using the holding handle 16.

The controller 20 stores a preset pressure range. The preset pressure range can be determined by experiments in multiple tests. The controller 20 can receive the pressure value output from the pressure sensor 14 and compare the received pressure value with the pressure range. If the pressure detected by the pressure sensor 14 is out of the preset pressure range, the controller 20 can give an alarm. In the present embodiment, the controller 20 also includes a display screen 21 to display a value of the received pressure, the assembly worker can assess whether or not further processing is required according the received pressure value displayed on the display screen 21.

Figure 3:
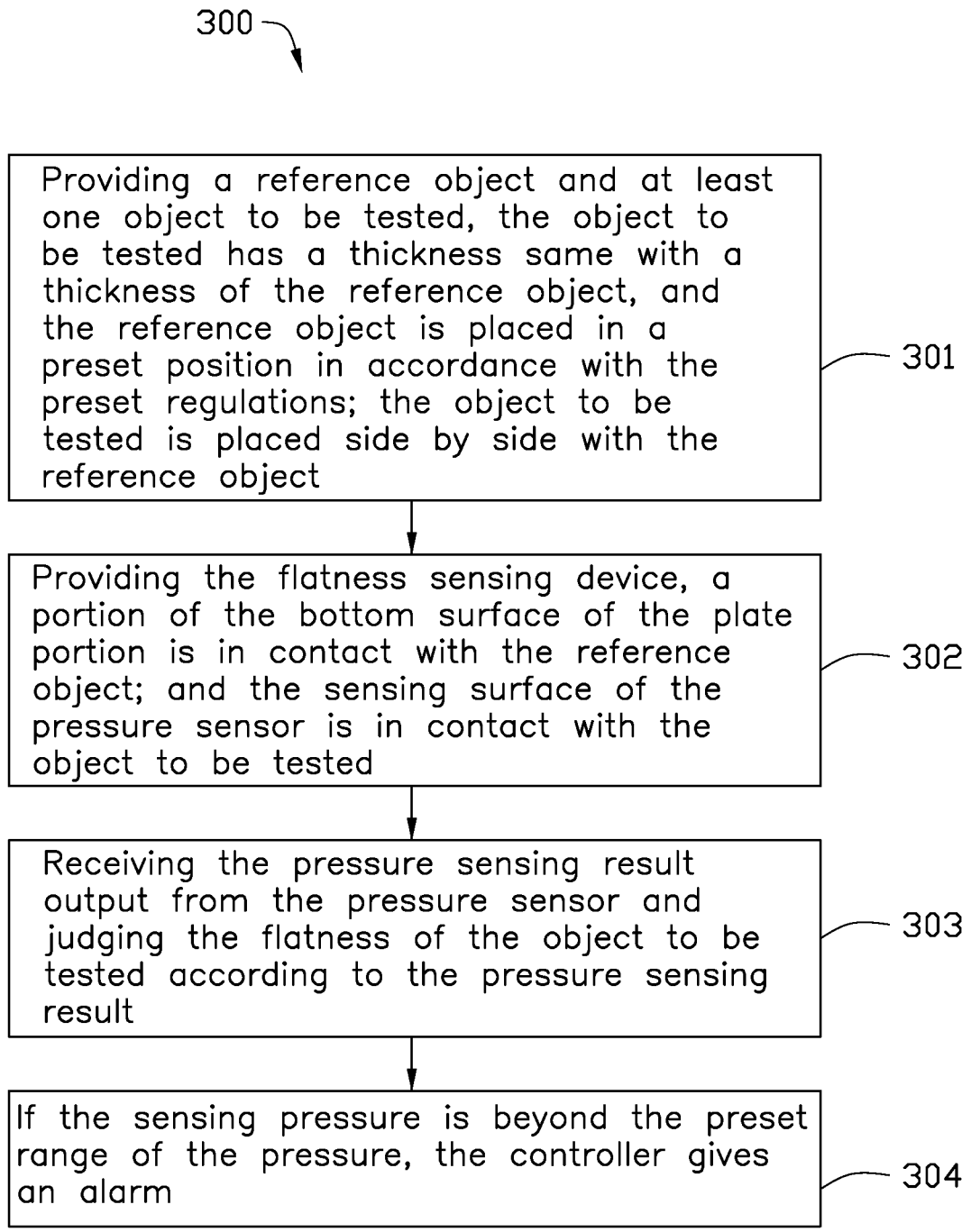
FIG. 3 is a flowchart of a method for flatness sensing using the flatness sensing device in FIG. 1.

FIG. 3 illustrates a flatness detection method using the flatness detection apparatus 100 according to one embodiment. The method 300 is provided by way of embodiment as there are a variety of ways to carry out the method. The method 300 can begin at block 301.

At block 301, a reference object and at least one object to be tested are provided. The object to be tested has the same thickness as a thickness of the reference object, to use coplanarity with the reference object. The reference object is placed in a preset position in accordance with a preset rules, the preset rules referring to required flatness of the reference object. The object to be tested is placed side by side with the reference object, and the upper surface of the object to be tested is roughly flush with the reference object. Flatness of the object can be determined by using the pressure sensing value relative to the reference object combined with the pressure sensor 14. The preset position described above may refer to a bearing frame that carries the reference object and the object to be tested.

At block 302, a portion of the bottom surface 130 of the plate portion 12 being in contact with the reference object, the sensing surface 140 of the flatness sensing device 100 is thus in contact with the object to be tested. In the embodiment, one part of the pressure sensing unit 10 contacts the reference object and the other part of the pressure sensing unit 10 contacts the object to be tested. That is, a portion of the bottom surface 130 of the plate portion 12 is in contact with the reference object and the other part is in contact with the object to be tested. If the sensing surface 140 of the pressure sensor 14 is level with the bottom surface 130 of the bottom plate 120, the flatness of the reference object meets requirement. If the object to be tested is not flat, any high point or high area applies pressure on the sensing surface 140 and this can be sensed.

At block 303, the controller 20 receives signal output from the pressure sensor 14 and determines the flatness of the object being tested. A preset pressure range is stored in the controller 20, and the preset pressure range is determined by experiment. The controller 20 compares the pressure value output from the pressure sensor 14 with the pressure range. If the sensed pressure value is within a preset pressure range, this represents sufficient flatness of the object being tested. If the sensed pressure value is beyond a preset pressure range, this represents insufficient flatness of the test object.

At block 304, if the sensing pressure is beyond the preset range of the pressure, the controller 20 gives an alarm.

The flatness sensing device 100 can also be used for the detection of the surface smoothness of a single object, that is, not being compared. When the object under test has a part of the surface flatness in accordance with requirements, then such flatness of the surface can be used as a standard to determine a flatness of other parts of the surface.

Figure 4:
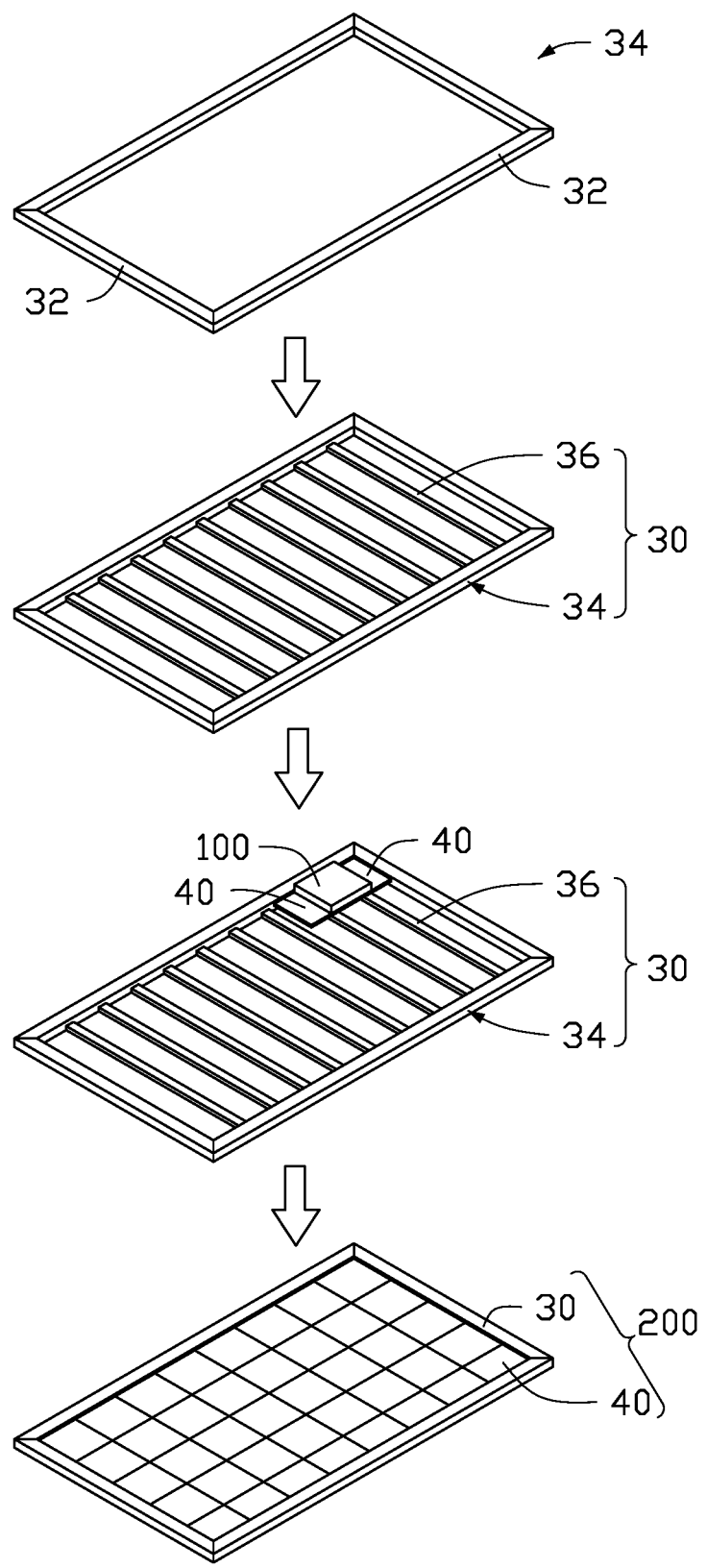
FIG. 4 is an isometric view of an LED display screen assembled using the flatness sensing device in FIG. 1.

FIG. 4 shows an actual application of the flatness sensing device 100 in one embodiment. The flatness sensing device 100 is used in the assembly of an LED display screen to detect a joined flatness of the basic units, that is, to detect an overall flatness of the LED display screen.

First, a bearing frame 30 is provided. The bearing frame 30 includes a plurality of border bars 32, and the plurality of border bars 32 is assembled to form a border 34. In the embodiment, the border 34 includes four border bars that are perpendicular to each other. A plurality of keels 36 are also included, the plurality of keels 36 are equidistantly spaced into the border 34 to obtain the bearing frame 30.

Secondly, a number of uniform size LED display panel units 40 is provided, and a first LED display panel unit 40 is installed in the bearing frame 30. Vertical sides of the first LED display panel unit 40 are located on the two perpendicular sides of the carrying frame 30. The flatness of the first LED display panel unit 40 relative to the bearing frame 30 is adjusted to a prescribed range by using a horizontal instrument.

The first LED display panel unit 40 is set as a reference object. Additional LED display panel units 40 are positioned adjacent to the reference LED display panel unit 40. The reference LED display panel unit 40 is arranged side by side with the additional LED display panel units 40, and each LED display panel unit 40 is in contact with another.

Finally, the flatness sensing device 100 is used. The pressure sensing unit 10 of the flatness sensing device 100 contacts the reference object and the object to be tested. That is, when a portion of the bottom surface 130 of the plate portion 12 is set on the reference LED display panel unit 40, and a thickness of the reference LED display panel unit 40 is consistent with a thickness of the additional LED display panel units 40, the additional LED display panel units 40 or one or more of them applies a pressure to the sensing surface 140 of the pressure sensor 14.

In the embodiment, the left half of the bottom surface 130 of the plate portion 12 is in contact with the reference LED display panel unit 40, and the right half portion is in contact with an additional LED display panel unit 40. The sensing surface 140 of the pressure sensor 14 detects the pressure value applied to the pressure sensing unit 10 by the additional LED display panel unit 40 and transmits the pressure value to the controller 20.

The controller 20 is stored with a preset pressure range, and the controller 20 can compare the received pressure value with the preset pressure range. If the sensed pressure value is within the preset range of the pressure, the controller 20 determines that the additional LED display panel unit 40 is flat relative to the reference LED display panel unit 40. If the perceived pressure value exceeds the preset range of the pressure, the controller 20 determines that the additional LED display panel unit 40 is not flat relative to the reference LED display panel unit 40.

If the pressure sensed by the sensor surface 140 exceeds the preset range of the pressure, the controller 20 issues an alarm. If the controller 20 issues an alarm, a user can determine whether the additional LED display panel unit 40 is within a normal or acceptable range compared to the reference LED display panel unit 40.

The user can see the specific pressure values displayed on the display screen 21. It is possible for the user to adjust the flatness of the additional LED display panel unit 40. The flatness sensing device 100 can be slid using the handle 16 across all adjacent LED display panel units 40, the flatness of the reference LED display panel unit 40 being the standard. All the LED display panel units 40 can be installed by this method, and the final assembled LED display screen 200 is obtained.

When the flatness sensing device 100 is in use, the controller 20 may be fixed on the fixing frame 122 to enable the user seeing the pressure sensing results in real time.

In this disclosure, one part of the plate portion 12 is fitted to the surface of the reference object, and the part of comprising the pressure sensor 14 is in contact with an object to be tested. Any pressure arising from non-flatness is applied to the pressure sensor 14 by the object to be tested, and such pressure represents non-flatness. The flatness of the object to be tested relative to the reference object is thus determined. When the sensing surface 140 is not in contact with the object to be tested, the controller 20 is unable to display sensed pressure values in real time, so it can be determined that the object to be tested is depressed relative to the reference object. The user can adjust the object to be tested until the controller can display a perceived pressure value.

The flatness sensing device 100 improves the assembly efficiency of the devices to be assembled.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A flatness sensing device comprising:
a pressure sensing unit and a controller adapted for data communication with the pressure sensing unit, wherein the pressure sensing unit comprises a plate portion, a pressure sensor fixed at an edge of the plate portion and exposed outside of the plate portion, a sensing surface of the pressure sensor is kept flush with the bottom surface of the plate portion; the sensing surface of the pressure sensor senses a pressure from an object applied on the sensing surface when the sensing surface comes into contact with the object, the controller receives the pressure value output from the pressure sensor and determines a flatness of the object to be tested.

2. The flatness sensing device of claim 1, wherein the plate portion comprises a bottom plate, and the sensing surface of the pressure sensor is kept flush with the bottom surface of the bottom plate.

3. The flatness sensing device of claim 2, wherein the plate portion further comprises a fixing frame fixed to the bottom plate, the fixing frame is a hollowed structure.

4. The flatness sensing device of claim 3, wherein a bottom surface area of the fixing frame is same with the bottom surface area of the bottom plate.

5. The flatness sensing device of claim 4, wherein the bottom plate is made from thermo-plastic or thermosetting plastic.

6. The flatness sensing device of claim 5, wherein a material of the plastic connecting member is selected from thermoplastic or thermosetting plastics, and the thermoplastic plastics is selected from the group consisting of poly butylene terephthalate (PBT), poly phenylene sulfide (PPS), poly ethylene terephthalate (PET), poly ether ether ketone (PEEK), poly carbonate (PC), and poly vinyl chloride (PVC); thermosetting plastics is selected from epoxy resin, polyurea resin or UV adhesive.

7. The flatness sensing device of claim 6, wherein the fixing frame is made of metal material or plastic.

8. The flatness sensing device of claim 7, further comprises at least one fixing block, the pressure sensor is fixed at an edge of the fixing frame via the at least one fixing block.

9. The flatness sensing device of claim 8, wherein the number of the at least one fixing blocks is two, each of the fixing blocks is substantially L-shaped and includes a vertical portion and a horizontal portion connected with the vertical portion, the vertical portions of the two fixing blocks are overlapped and fixed, and the horizontal portion is oppositely arranged, one of the horizontal portion is fixed with the fixing frame, and another one of the horizontal portions is configured to fix the pressure sensor.

10. The flatness sensing device of claim 9, wherein further comprises a handle, the handle is fixed on the fixing frame.

11. The flatness sensing device of claim 10, wherein the controller comprises a display screen to display a value of the received pressure.

12. The flatness sensing device of claim 11, wherein the plate portion has a bottom surface area of D1, the object to be tested has a bottom surface area of D2, and D2≤D1≤2×D2.

13. A flatness sensing method of the flatness sensing device comprising:
    providing a reference object and at least one object to be tested, a thickness of the object to be tested is same as a thickness of the reference object, and the reference object is placed in a preset position in accordance with preset rules; the object to be tested is placed side by side with the reference object;
    providing the flatness sensing device, a portion of the bottom surface of the plate portion is in contact with the reference object; and the sensing surface of the pressure sensor is in contact with the object to be tested; and
    receiving the pressure sensing result output from the pressure sensor and determining a flatness of the object to be tested according to the pressure sensing result.

14. The flatness sensing method of claim 13, wherein the step of determining a flatness of the object to be tested according to the pressure sensing result comprises:
    storing a preset pressure range in the controller,
    comparing the pressure sensing value output from the pressure sensor with the pressure range using the controller;
    if the sensed pressure value is within the preset pressure range, indicating the object being tested is sufficiently flat; and if the sensed pressure value is beyond a preset pressure range, indicating the object to be tested is insufficiently flat.

15. The flatness sensing method of claim 14, wherein:
    a flatness of the reference object relative to the preset position is adjusted to a prescribed range by using a horizontal instrument.

16. The flatness sensing device of claim 15, wherein further comprises: when the sensing pressure is beyond the preset range of the pressure, the controller gives an alarm.

17. The flatness sensing method of claim 13, wherein the preset position defines in a bearing frame, and the bearing frame bears the reference object and at least one object to be tested.

* * * * *